(12) United States Patent
Eliáš et al.

(10) Patent No.: US 9,372,891 B2
(45) Date of Patent: Jun. 21, 2016

(54) SYSTEM AND METHOD FOR QUERYING HYBRID MULTI DATA SOURCES

(71) Applicant: Red Hat, Inc., Raleigh, NC (US)

(72) Inventors: Filip Eliáš, Vysni Lhoty (CZ); Filip Nguyen, Brno (CZ)

(73) Assignee: RED HAT, INC., Raleigh, NC (US)

(*) Notice: Subject to any disclaimer, the term of this patent is extended or adjusted under 35 U.S.C. 154(b) by 207 days.

(21) Appl. No.: 14/106,488

(22) Filed: Dec. 13, 2013

(65) Prior Publication Data

US 2015/0169686 A1 Jun. 18, 2015

(51) Int. Cl.
*G06F 17/30* (2006.01)
(52) U.S. Cl.
CPC .... *G06F 17/30463* (2013.01); *G06F 17/30469* (2013.01)
(58) Field of Classification Search
USPC .......................................... 707/718, 722, 743
See application file for complete search history.

(56) References Cited

U.S. PATENT DOCUMENTS

| | | | | | |
|---|---|---|---|---|---|
| 6,138,156 | A * | 10/2000 | Fletcher | ................. | H04L 12/14 709/217 |
| 6,336,117 | B1 * | 1/2002 | Massarani | ......... | G06F 17/30867 707/711 |
| 7,984,043 | B1 * | 7/2011 | Waas | ................. | G06F 17/30932 707/718 |
| 8,516,554 | B2 | 8/2013 | Chalana et al. | | |
| 8,539,504 | B2 | 9/2013 | Bigelis et al. | | |
| 2006/0155694 | A1 * | 7/2006 | Chowdhury | ...... | G06F 17/30675 |
| 2006/0212593 | A1 * | 9/2006 | Patrick | .................. | G06Q 10/06 709/230 |
| 2007/0005679 | A1 * | 1/2007 | Bui | .................. | G06F 17/30964 709/201 |
| 2007/0043735 | A1 * | 2/2007 | Bodin | ............... | G06F 17/30964 |
| 2007/0061371 | A1 * | 3/2007 | Bodin | ............... | G06F 17/30569 |
| 2007/0083514 | A1 * | 4/2007 | Dettinger | ............ | G06F 17/3053 |
| 2007/0130112 | A1 * | 6/2007 | Lin | ..................... | G06F 17/3002 |
| 2007/0156668 | A1 * | 7/2007 | Dettinger | .......... | G06F 17/30448 |
| 2007/0156669 | A1 * | 7/2007 | Marchisio | .......... | G06F 17/30864 |
| 2007/0165538 | A1 * | 7/2007 | Bodin | .................. | H04L 67/325 370/254 |
| 2007/0192676 | A1 * | 8/2007 | Bodin | ................. | G06F 17/2264 715/205 |
| 2007/0226178 | A1 * | 9/2007 | Ewen | ................. | G06F 17/30442 |
| 2008/0014910 | A1 * | 1/2008 | Hsu | ........................ | H04L 12/585 455/414.2 |
| 2008/0147627 | A1 * | 6/2008 | Natkovich | .......... | G06F 17/3046 |

(Continued)

OTHER PUBLICATIONS

Joseph, Jeevan G., "ADF Application with multiple Data Sources or Database connections," Oracle ADF Notebook, Aug. 6, 2010, http://myadfnotebook.blogspot.in/2010/08/problem-adf-application-with-multiple.html , 8 pages.

(Continued)

*Primary Examiner* — Cam-Linh Nguyen
(74) *Attorney, Agent, or Firm* — Haynes & Boone, LLP

(57) ABSTRACT

A system and method of querying hybrid multi data sources includes receiving a query at a hybrid multi data source running on a computer server, creating a list of data sources, filtering the list of data sources based on data source hints included in the query, filtering the list of data sources based on data source rules, forming one or more query plans for processing the query, evaluating each of the query plans, selecting a first query plan from the query plans based on results of the evaluating, and performing the first query plan. Each query plan corresponds to a data source in the filtered list of data sources. In some examples, the first query plan has a lowest cost of each of the query plans. In some examples, the first query plan is based on probabilities associated with the cost of each of the query plans.

18 Claims, 6 Drawing Sheets

(56) References Cited

U.S. PATENT DOCUMENTS

| | | | |
|---|---|---|---|
| 2010/0125574 A1* | 5/2010 | Navas | G06F 17/30516 707/722 |
| 2011/0161328 A1* | 6/2011 | Park | G06F 17/30516 707/743 |
| 2011/0320586 A1 | 12/2011 | Maltz et al. | |
| 2012/0110656 A1* | 5/2012 | Santos | H04L 63/0263 726/13 |
| 2012/0130987 A1 | 5/2012 | Bose et al. | |
| 2012/0215763 A1* | 8/2012 | Hughes | G06F 17/30566 707/718 |
| 2013/0054600 A1 | 2/2013 | Somogyi et al. | |
| 2013/0073589 A1 | 3/2013 | Smith et al. | |
| 2013/0097151 A1* | 4/2013 | Cushing | G06F 17/30592 707/722 |
| 2013/0173590 A1* | 7/2013 | Ghazal | G06F 17/30483 707/714 |
| 2013/0246376 A1* | 9/2013 | Padmanabhan | G06F 17/30563 707/694 |
| 2014/0029615 A1* | 1/2014 | Baldwin | H04L 67/306 670/392 |

OTHER PUBLICATIONS

Papavasileiou, Vicky, "Optimal access to database and web application data by distributed query processing," UC San Diego, App2you Inc., http://db.ucsd.edu/NSF10FWD/main.pdf, retrieved Dec. 13, 2013, 10 pages.

Fu, Yupeng et al., "Declarative Ajax Web Applications through SQL++ on a Unified Application State," Proceedings of the 14$^{th}$ International Symposium on Database Programming Languages (DBPL Aug. 3, 2013), http://arxiv.org/abs/1308.0656, 11 pages.

Topaloglou, Thodoros et al., "Seamless Integration of Biological Applications within a Database Framework," Data Logic, A Division of Gene Logic Inc., 1999, retrieved Dec. 13, 2013, http://www.anthonykosky.com/pdf_files/ISMB_99.pdf, 10 pages.

* cited by examiner

410 — if SELECT contains WHERE with operators = or LIKE and ORDER BY then set type nosql, relational 420 — if SELECT contains JOIN or GROUP BY then set type relational 430 — if INSERT then set type nosql 440 — if DELETE contains WHERE then set type file_flat

*FIG. 4*

SYSTEM AND METHOD FOR QUERYING HYBRID MULTI DATA SOURCES

BACKGROUND

The present disclosure relates generally to computing systems, and more particularly to querying of hybrid multi data sources.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other. In order to do so, a server or some other computing system may provide an interface through which service requests are made by the other computing devices or clients. In these service-oriented architectures (SOAs), the clients generally make a service request by sending a request message to the server hosting a requested service and/or application using, for example, a networking protocol. The server receives the message, activates the requested service or application, and returns a response message with the result. For example, a very basic form of services is demonstrated by a request for a web page. A client, such as a web browser, sends a Hypertext Transport Protocol (HTTP) request to a web server which receives the HTTP request and generates a response containing the requested web page, that is then returned to the web browser. As many services and/or applications execute, they access one or more data sources that store data that is relevant to the requested services. For example, these data sources may include relational databases, nosql databases, flat files, and/or the like. Each of the data sources typically supports its own query mechanism and/or query language and has different kinds of queries that it supports well and other kinds of queries that it does not support well. For the service or application to make the best use of this hybrid collection of multiple data sources, it has to be aware of each of the query mechanisms, query languages, advantages, and/or disadvantages of each of the data sources. This is generally not practical as the data sources that are available may change over time. In addition, each vendor often supports variations in query mechanisms and/or query languages.

Accordingly, it would be desirable to provide systems and methods to make it easier for services and/or applications to make an intelligent selection from multiple available data sources and then to direct a query to the selected data source.

SUMMARY

According to one example, a method of processing a data source query includes receiving the data source query at a hybrid multi data source running on a computer server, creating a list of data sources, filtering the list of data sources based on data source hints included in the data source query, filtering the list of data sources based on data source rules, forming one or more query plans for processing the data source query, evaluating each of the query plans, selecting a first query plan from the query plans based on results of the evaluating, and performing the first query plan. Each query plan corresponds to a data source in the filtered list of data sources.

According to another example, a hybrid multi data source hosted in an application server includes a hint resolver, a rule evaluator coupled to the hint resolver, and a federated query engine coupled to the hint resolver and the rule evaluator. The hybrid multi data source is configured to receive a query; and create a list of data sources coupled to the hybrid multi data source. The hint resolver is configured to receive the list of data sources from the hybrid multi data source and filter the list of data sources based on hints included in the query. The rule evaluator is configured to receive the list of data sources from the hybrid multi data source or the hint resolver, receive the query from the hybrid multi data source, and filter the list of data sources based on data source rules. The federated query engine is configured to receive the filtered list of data sources from the hint resolver or the rule evaluator, receive the query from the hybrid multi data source, form one or more query plans for processing the query, evaluate each of the query plans to determine a respective estimated cost to perform each of the query plans, select a query plan from the query plans based on each respective estimated cost, and perform the selected query plan. Each query plan corresponds to a data source in the filtered list of data sources.

According to yet another example, a non-transitory machine-readable medium comprising a first plurality of machine-readable instructions which when executed by one or more processors associated with an application server are adapted to cause the one or more processors to perform a method. The method includes receiving a data query at a hybrid multi data source running on the application server, creating a list of data sources coupled to the hybrid multi data source, filtering the list of data sources based on source hints included in the data query, filtering the list of data sources based on source rules, forming one or more query plans for processing the data query, evaluating each of the query plans to determine a respective estimated query complexity for each of the query plans, selecting a query plan from the query plans based on each respective estimated query complexity, and performing the selected query plan. Each query plan corresponds to a data source in the filtered list of data sources.

BRIEF DESCRIPTION OF THE DRAWINGS

FIG. 4 is a simplified diagram of some representative data source rules according to some examples.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
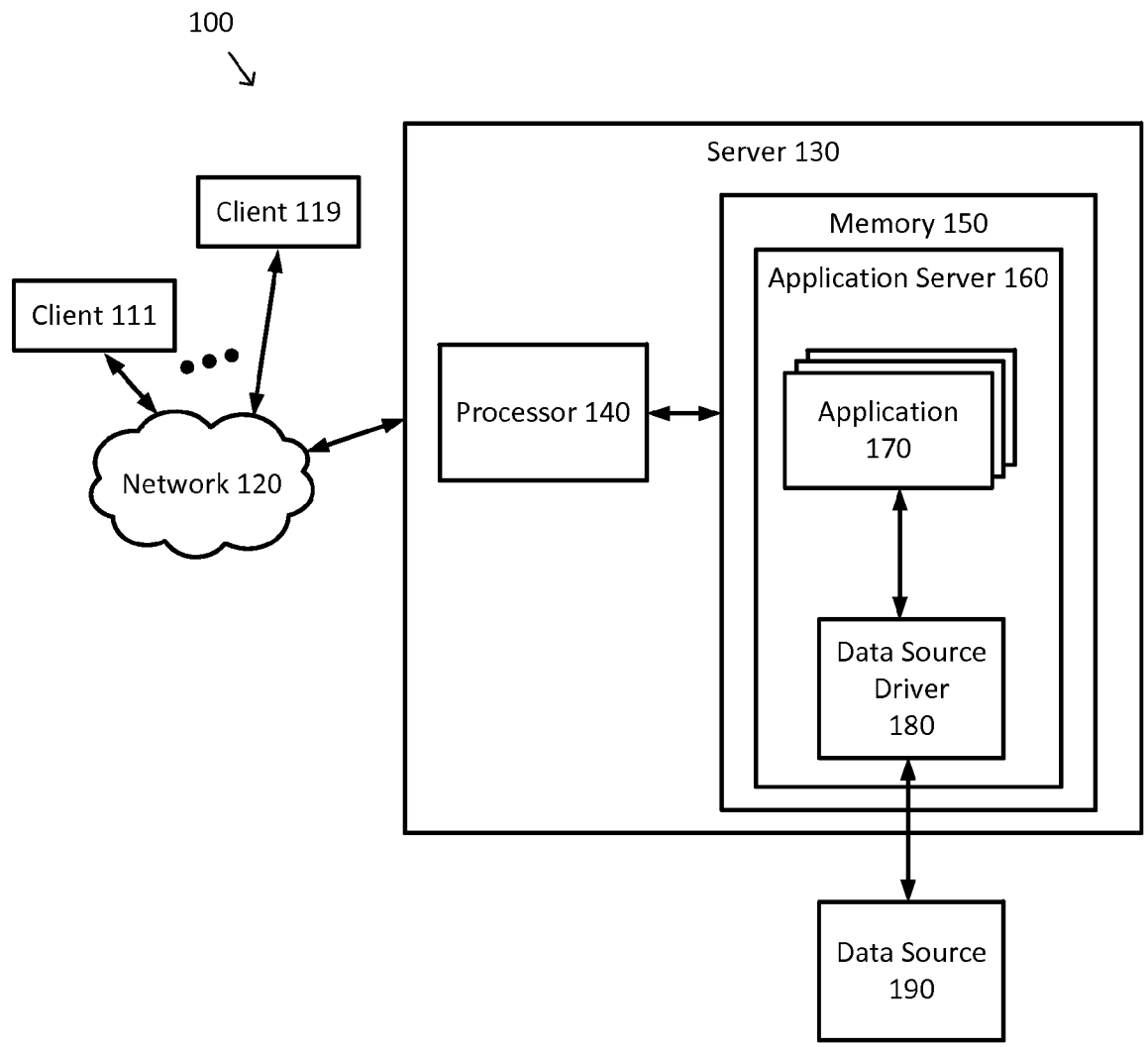
FIG. 1 is a simplified diagram of a service-oriented architecture according to some examples.

FIG. 1 is a simplified diagram of a service-oriented architecture (SOA) 100 according to some examples. As shown in FIG. 1, SOA 100 is built around a client-service model. In SOA 100, service requests originate from one or more clients 111-119. Each of the clients 111-119 may make service requests through a network 120 to a server 130. Network 120 may be any kind of network including a local area network (LAN), such as an Ethernet, and/or a wide area network (WAN), such as the internet. In some examples, server 130 may be a standalone workstation, a cluster, a production server, within a virtual machine, and/or the like. Server 130 includes a processor 140 coupled to memory 150. In some examples, processor 140 may control operation and/or execution of hardware and/or software on server 130. Although only one processor 140 is shown, server 130 may include multiple processors, multi-core processors, field programmable gate arrays (FPGAs), application specific integrated circuits (ASICs), and/or the like. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 150 may be used to store an application server 160. Application server 160 includes one or more interfaces for receiving service requests from the one or more clients 111-119. Each of the service requests is then directed to at least one of the one or more services or applications 170 being hosted by application server 160. Numerous mechanisms for directing the service requests to the respective application 170 may be used including providing a uniform resource locator (URL) for the application in the respective service request, providing an application name of the application in the respective service request, and/or the like. The service requests may also be made using protocols such as remote procedure call, web services, and/or the like.

As each of the applications 170 handles its respective service requests, each application 170 is are often called upon to access data in one or more data sources. This typically includes identifying a data source, and forming a query to access the data source, and forwarding the query to a data source driver 180. Data source driver 180 then accesses a corresponding data source 190 where the query is handled. When processing of the query completes, a response is typically generated and returned to application 170 through data source driver 180. In some examples, each application 170 may forward the query to data source driver 180 using an application programming interface (API) call, and/or the like. In some examples, data source driver 180 may be an open database connectivity (ODBC) driver, a java database connectivity (JDBC) driver, and/or the like. In some examples, data source 190 may be a relational database, a nosql database, a flat file, an eXtensible Markup Language (XML) file, a representational state transfer (REST) web service, a Simple Object Access Protocol (SOAP) web service, and/or the like. In some examples, the query may retrieve data from data source 190 and/or write data to data source 190.

As discussed above and further emphasized here, FIG. 1 is merely an example which should not unduly limit the scope of the claims. One of ordinary skill in the art would recognize many variations, alternatives, and modifications. In some examples, other architectures may be used with application server 160. In some examples, application server 160 may be hosted in one or more virtual machines and/or Java virtual machines running on server 130. In some examples, server 130 and/or memory 150 may also be used to host more than one application server. In some examples, application server 160 may include more than one data source driver 180 for accessing additional data sources 190. In some examples, each of the data sources 190 may be of different types. In some examples, one or more of the data sources may be hosted in server 130, coupled to server 130 using connectors and/or cabling, and/or coupled to server 130 over a network, such as network 120.

The limitations of the architecture and approach of FIG. 1 are generally exposed when each of the applications 170 has access to multiple data sources 190, especially when each of the data sources 190 is of a different type. Other than providing a somewhat abstract interface between each application 170 and each data source 190, each of the data source drivers 180 generally does little to mask differences in the capabilities of each of the data sources 190. Because each data source type typically supports its own query mechanism and/or query language, which may vary from vendor to vendor even when the data sources are of the same general type. For example, the structured query language (SQL) used to access an Oracle relational database may vary from and support different features than the SQL used to access other relational databases, such as a PostgreSQL relational database. In addition, each of the data sources 190 may support different kinds of queries better than others. In order for each application 170 to make the best use of the data sources 190, it has to be aware of each of the query mechanisms, query languages, advantages, and/or disadvantages of each of the data sources 190. This is generally not practical as the data sources 190 that are available may change over time. Further, each application developer may not have the resources to provide such sophisticated data source querying capabilities in each of the applications 170.

One potential solution to this problem is to provide a single access point for each of the data sources available to the applications. Rather than directing each data source query to a separate data source driver, each of the applications forwards the query to a hybrid multi data source that intelligently selects from the available data sources, adapts the query to the selected data source, and accesses the selected data source through a corresponding data source driver.

Figure 2:
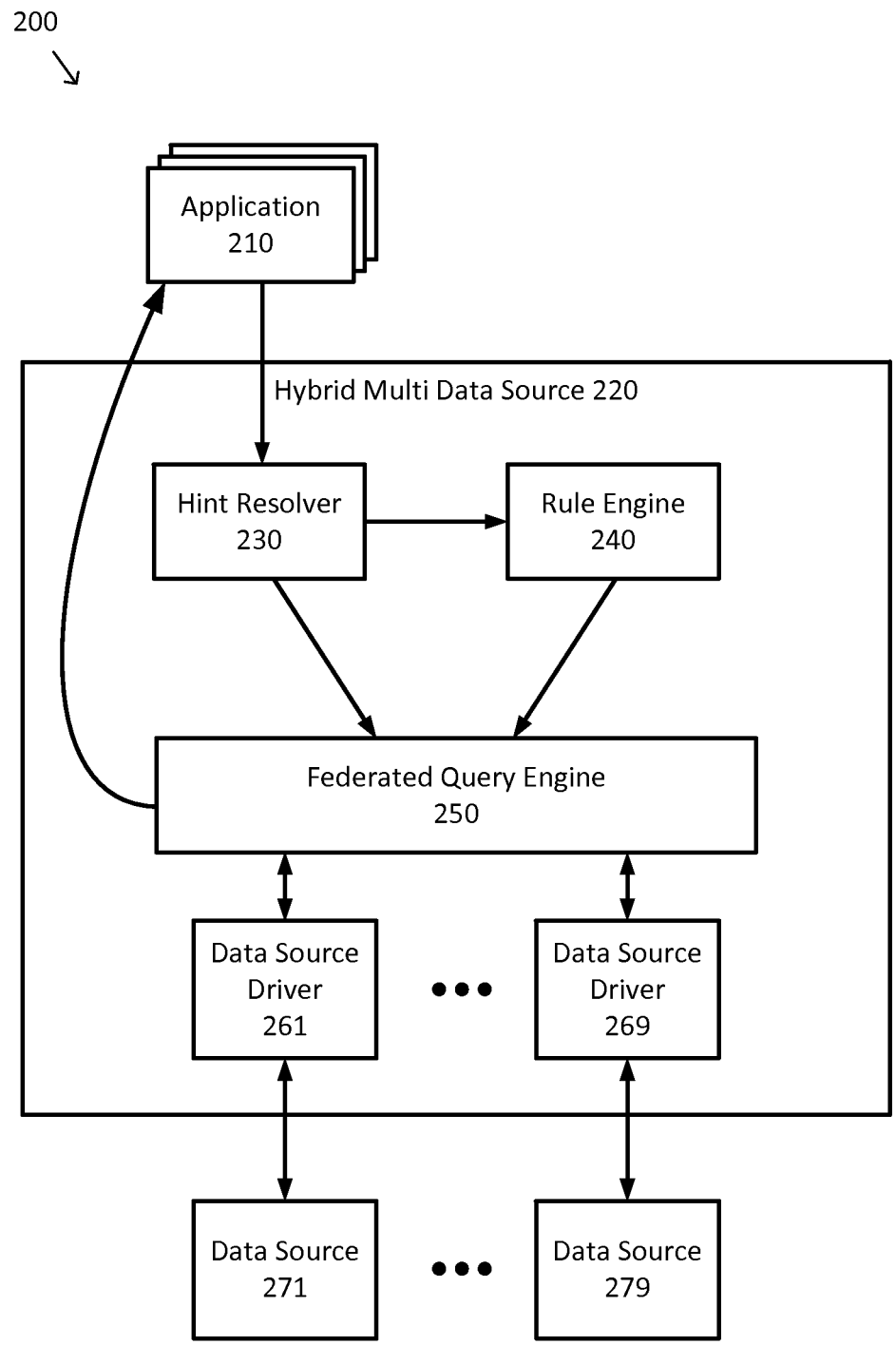
FIG. 2 is a simplified diagram of an application server hosting a hybrid multi data source according to some examples.

FIG. 2 is a simplified diagram of an application server 200 hosting a hybrid multi data source according to some examples. As shown in FIG. 2, application server 200 hosts one or more applications 210. In some examples, each of the applications 210 may be similar to the applications 170 except that they may be adapted for use with a hybrid multi data source. Rather than directing data source queries to individual data source drivers, each of the applications 210 directs data source queries to an interface of a hybrid multi data source 220 using a uniform query language even when the data associated with the queries may be located in different types of data sources. In some examples, each application 170 may direct the data source queries to the interface of hybrid multi data source 220 using an API call, and/or the like. In some examples, the interface may be similar to an ODBC, a JDBC, and/or other data source driver interfaces.

Upon receiving a data source query, hybrid multi data source 220 examines the data source query to see if the application has included any hints regarding a data source to use to handle the data source query. In some examples, the hints may be compatible with the SOURCE_TYPE SQL extension that allows a query author to suggest one or more data source types to use to process a query. When hints are included in the data source query, they are examined by a hint resolver 230. Hint resolver 230 determines which types of data sources are suggested in the query and compares them to a list of available data sources. When there is overlap between the available data sources and the hints, the list of available data sources is filtered by the hints to remove any data sources that are of a type not included in the hints. When there are no hints included in the query or the hints do not overlap the types of the available data sources, the data source query is then passed to a rule engine 240 for further processing. When the hints are used to filter the list of available data sources, rule engine 240 is skipped and the data source query and the filtered list of available data sources are forwarded to a federated query engine 250.

Rule engine 240 examines the data source query to determine the types of query operations requested in the data source query. In some examples, the types of query operations may correspond to SQL query operations such as JOIN, ORDER BY, SORT BY, LIMIT, WHERE, and/or the like. Using a set of data source filtering rules, and the determined types of query operations, rule engine 240 filters the list of available data sources by type. As an example, a data source filtering rule may indicate that a data source query containing a JOIN operation may be preferentially handled by a relational database rather than some other type of data source. As with the hints, the data source filtering rules are applied when there is an overlap between the list of available data sources and the recommendations of the data source filtering rules. In some examples, the data source filtering rules may be provided by an administrator, an operator, and/or a user of the application server and hybrid multi data source 220. After filtering by rule engine 240, the data source query and the filtered list of available data sources are forwarded to federated query engine 250.

In some examples, federated query engine 250 may be an extended version of a federated query engine such as the JBoss Teiid data virtualization engine from Red Hat, Inc., the Oracle Data Service Integrator (ODSI), the InfoSphere Platform from IBM, and/or the like.

A typical federated query engine supports a uniform interface and a query language that may be used with any type of data source. By providing a uniform interface and a uniform query language, the federated query engine allows the data source query to be processed cooperatively between the federated query engine and a data source. The federated query engine is able to do this by understanding the capabilities, specific query languages, and query mechanisms of each type of data source that is available to it. For example, when the data source query includes a SORT BY clause and the selected data source does not support sorting (e.g., when the selected data source is a flat file), the federated query engine may use an abbreviated query to retrieve data from the data source and then sort the retrieved data itself. In some examples, the federated query engine creates a query plan based on the data source query and the capabilities of the selected data source. The features of the data source query that the selected data source cannot perform are handled by the federated query engine after retrieving data from the selected data source using one or more abbreviated queries.

However, in the case of the hybrid multi data source 220, federated query engine 250 includes the capabilities of a typical federated query engine and is also able to intelligently select a data source from the filtered list of available data sources provided by hint resolver 230 and/or rule engine 240. Federated query engine 250 does this by creating a query plan for each of the data sources in the filtered list of available data sources, evaluates each of the query plans using a weighted sum approach, where each operation performed by federated query engine 250 are assigned a weight or cost based on its complexity and/or estimated time to perform and each type of data source is assigned a weight based on an estimated cost to access the respective data source based on an abbreviated query. In some examples, the data source associated with the lowest cost query plan becomes the selected data source. In some examples, federated query engine 250 may also provide load balancing among the filtered list of available data sources by selecting the selected data source probabilistically based on the cost of each query plan. In some examples, federated query engine 250 may also provide failover support by switching to a secondary choice for the selected data source when the selected data source is not able to handle the abbreviated query.

Once a data source is selected, the data source query is processed by federated query engine 250. Each of the abbreviated queries in the query plan associated with the selected data source is forwarded to a respective one of a plurality of data source drivers 261-269. The respective data source driver 261-269 is then used to access a corresponding one of a plurality of data sources 271-279. Federated query engine 250 is then used to complete any additional query processing in the query plan. Once processing of the query plan is complete, the result of the query is then returned to the respective application 210 that sent the data source query to hybrid multi data source 220. In some examples, each of data sources 271-279 may be a relational database, a nosql database, a flat file, an XML file, a REST web service, a SOAP web service, and/or the like.

In some examples, because federated query engine 250 may potentially select from any of the data sources 271-279, each of the data sources 271-279 should contain copies of the same data. This ensures that no matter the data source 271-279 selected, the results of the data source query are going to be the same. In some examples, federated query engine 250 may direct any data source query that alters data (e.g., a DELETE, INSERT, ALTER and/or UPDATE query) to each of the data sources 271-279 to maintain the same data in each of the data sources 271-279. In some examples, other mechanisms may be used to maintain data consistency across data sources 271-279.

Figure 3:
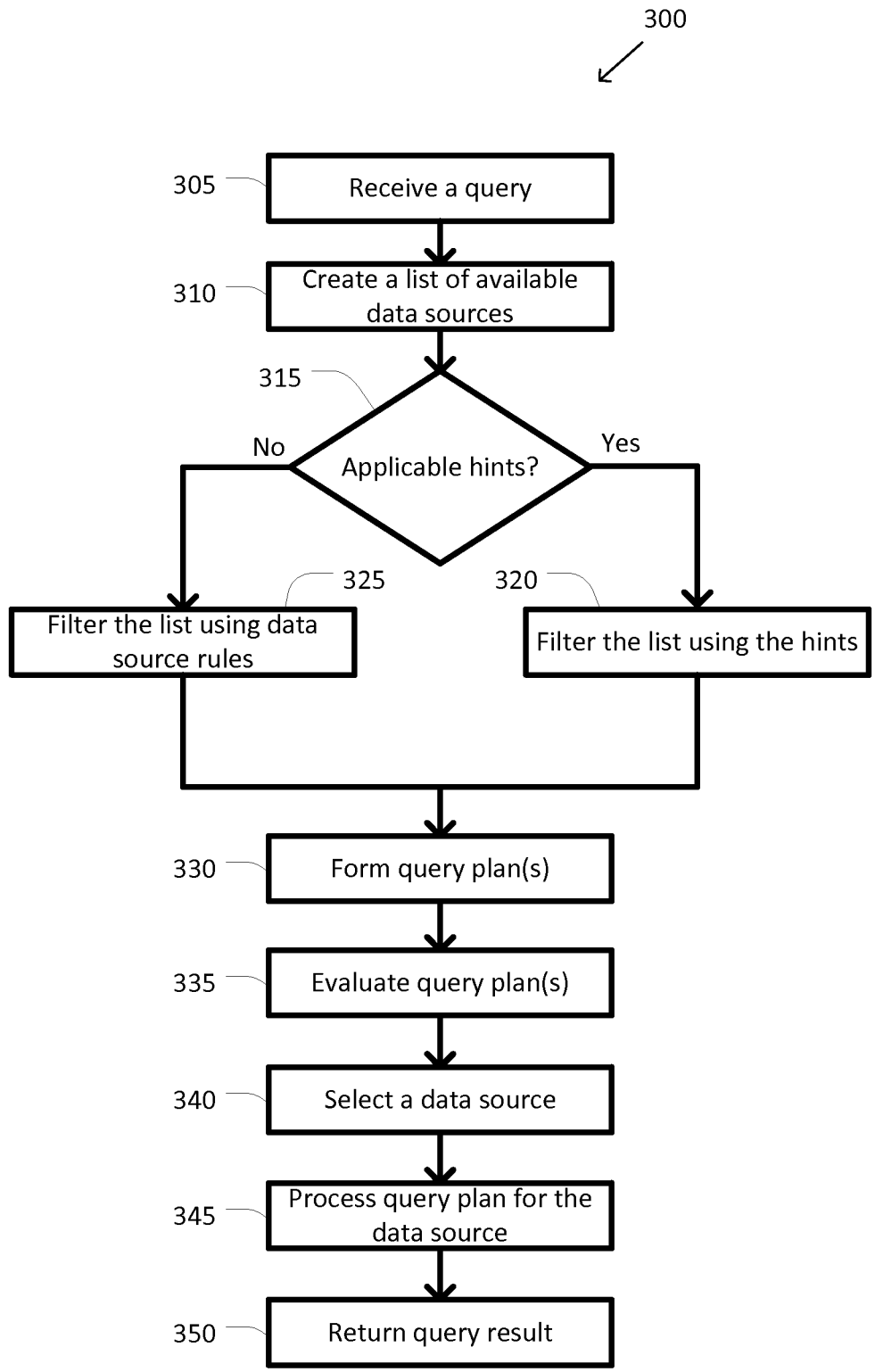
FIG. 3 is a simplified diagram of a method of query handling according to some examples.

FIG. 3 is a simplified diagram of a method 300 of query handling according to some examples. In some examples, one or more of the processes 305-350 of method 300 may be implemented, at least in part, in the form of executable code stored on non-transient, tangible, machine readable media that when run by one or more processors (e.g., the processor 140 of server 130) may cause the one or more processors to perform one or more of the processes 305-350. In some examples, method 300 may be used by hybrid multi data source 220 to receive and process data source queries.

At a process 305, a query is received. The query may be received by a hybrid multi data source, such as hybrid multi data source 220, from a service and/or an application. For example, the service and/or the application may use an API call or similar mechanism to send the query to the hybrid multi data source.

At a process 310, a list of available data sources is created. Using drivers associated with each of the data sources that may be accessed and used by the hybrid multi data source, the hybrid multi data source determines which of the data sources is currently available for handling queries. In the examples, of FIG. 2, hybrid multi data source 220 may use one or more API calls of each of the data source drivers 261-269 to determine which of the data sources 271-279 is available to handle queries and is added to the list of available data sources. The list of available data sources may also include type information for each of the available data sources.

At a process 315, it is determined whether the query includes any applicable hints. The query received during process 305 is examined to determine whether it includes any data source hints. In some examples, the hints may be compatible with the SOURCE_TYPE SQL extension that allows a query author to suggest one or more data source types to use to process a query. In some examples, the query may include the SOURCE_TYPE keyword followed by a list of data source types, such as relational, nosql, file_flat, file_xml, and/or the like. When hints are included in the data source query, the hints are examined to determine whether there is any overlap with the data source types in the list of available data sources. When there is overlap between the data source types in the list of available data sources and the hints, the list of available data sources is filtered by the hints using a process 320. When there are no hints included in the query or the hints do not overlap the types of data sources in the list of available data sources, the list of available data sources is filtered using data source rules using a process 325. In some examples, process 315 may be performed using hint resolver 230.

At the process 320, the list of available data sources is filtered using the hints. The hints determined during process 315 are used to filter the list of available data sources created during process 310. In some examples, the list of available data sources is iterated through and each data source that does not have a type that is included in the types found in the hints is removed from the list of available data sources. The list of filtered data sources and the query are then further processed beginning with a process 330. In some examples, process 320 may be performed using hint resolver 230.

At the process 325, the list of available data sources is filtered using data source rules. The list of available data sources created during process 310 is filtered based on data source rules provided to the hybrid multi data source by an operator, an administrator, and/or a user of the application server or the hybrid multi data source. The operator, administrator, and/or user may use the data source rules to express a preference for one or more types of data source to use based on the features of the query received during process 305. Each of the data source rules is evaluated based on the features of the query and when the query includes the features identified in the respective rule, the indicated data source types are added a list of preferred data source types. When there is no overlap between the list of preferred data source types and the types of the data sources in the list of available data sources, the data source rules are ignored. Otherwise, the list of available data sources is filtered using the list of preferred data sources. In some examples, the list of available data sources is iterated through and each data source that does not have a type that is included in the list of preferred data source types is removed from the list of available data sources. The list of filtered data sources and the query are then further processed beginning with a process 330. In some examples, process 325 may be performed using rule evaluator 240.

FIG. 4 is a simplified diagram of some representative data source rules according to some examples. As shown in FIG. 4, four representative data source rules are shown to illustrate some of the data source rules that may be applied by process 325 and/or rule evaluator 240. It is understood that the actual set of data source rules applied by process 325 and/or rule evaluator 240 may be different, include fewer rules, and/or include more rules.

A rule 410 is applicable to queries based on a SELECT statement. More specifically, rule 410 indicates that when the query is a SELECT statement that includes a WHERE clause that uses the operators equal or LIKE and the SELECT statement includes an ORDER BY clause, the preference is to the process the query using a nosql or a relational database.

A rule 420 is also applicable to queries based on a SELECT statement. More specifically, rule 420 indicates that when the query is a SELECT statement that includes a JOIN clause and/or a GROUP BY clause, the preference is to the process the query using a relational database.

A rule 430 is applicable to queries based on an INSERT statement. More specifically, rule 430 indicates that when the query is an INSERT statement, the preference is to process the query using a nosql database.

A rule 440 is applicable to queries based on a DELETE statement. More specifically, rule 440 indicates that when the query is a DELETE statement that includes a WHERE clause, the preference is to process the query using a flat file data source.

Referring back to FIG. 3, at the process 330, one or more query plans are formed. A query plan is formed for each of the data sources that remain in the filtered list of data sources. Each of the query plans is based on how a federated query engine, such as federated query engine 250, would implement the processing for the query received during process 305 based on the capabilities of the respective data source. This may include assessing the capabilities of the respective data source and dividing the processing for the query between one or more abbreviated queries sent to the respective data source and processing that is handled by the federated query engine.

Figure 5:
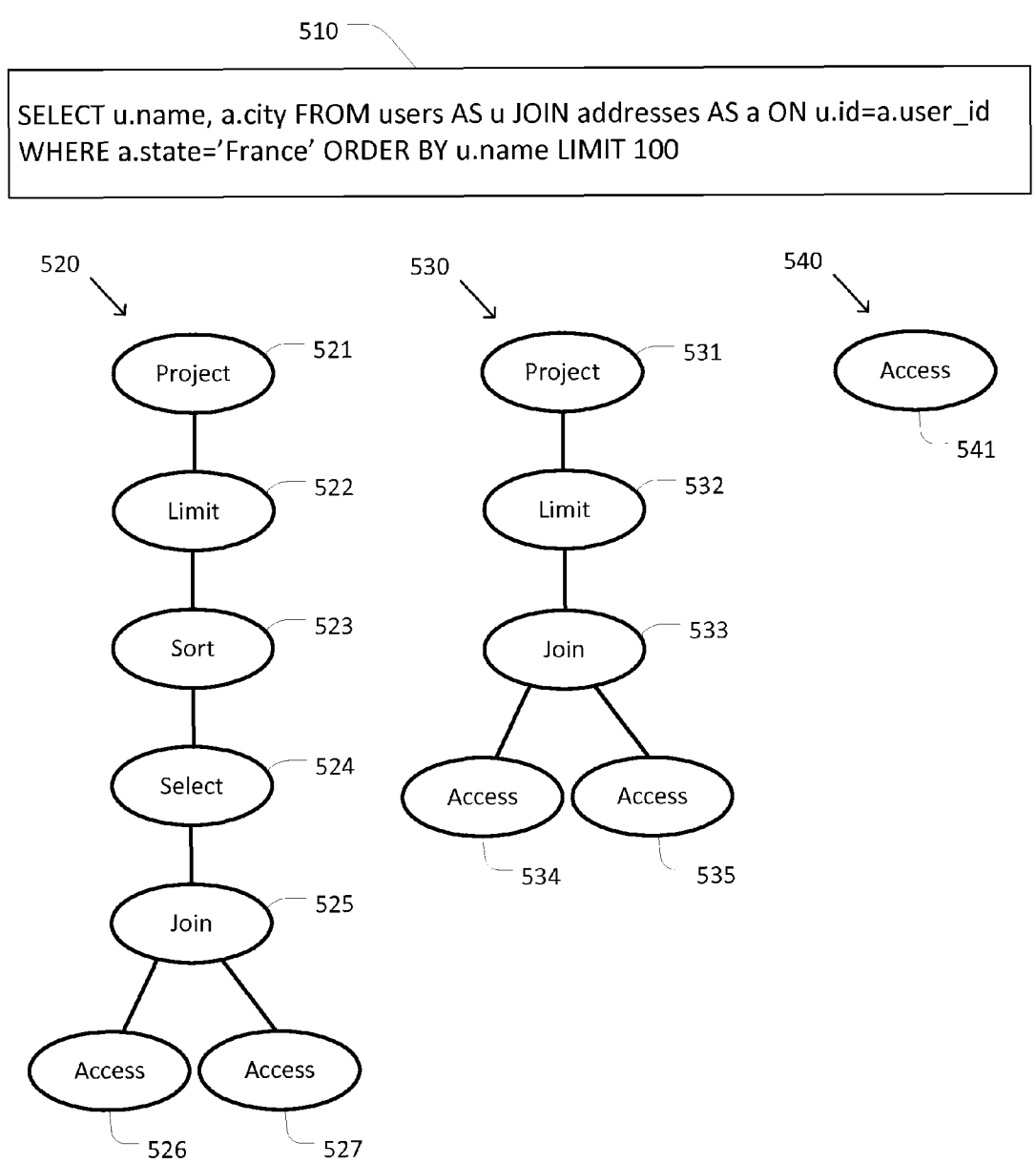
FIG. 5 is a simplified diagram of representative query plans for a query according to some examples.

FIG. 5 is a simplified diagram of representative query plans for a query according to some examples. FIG. 5 shows three query plans 520, 530, and 540 for a query 510 based on a SQL SELECT statement. The SELECT statement of query 510 accesses a data source to identify the name and city for all users that live in France. The results are then ordered by the name of the user and then limited so that the first 100 are returned. To process this query, data from the users and addresses table is joined together to create a preliminary result where the address is matched to a user based on an id shared between the respective user and address. The preliminary results are then filtered to retain those results where the address is in France, the filtered results are then sorted in ascending order, and then the first 100 are selected. As a final step, the results are projected so that just the name and city fields remain. Depending on the type of the data source, certain parts of the query 510 may be handled in the data source and the remaining parts are handled in the federated query engine. This is represented in the different query plans 520, 530, or 540.

Query plan 520 is representative of a query plan that may be used by the federated query engine when the data source is a file, such as a flat file or an XML file. File-based data sources provide little or no query support beyond the ability to access and/or retrieve data from the corresponding file. Query plan 520 demonstrates a query building process where the federated query engine does most of the data matching, reduction, and organizing that is specified in query 510. Query plan 520 is organized as a tree and includes processing operations for a projecting 521, a limiting 522, a sorting 523, a selecting 524, a joining 525, and two accessing 526 and 527 operations. Query plan 520 is generally processed from bottom to top beginning with the accessing operations 526 and 527 and ending with the projection operation 521.

For example, if query plan 520 were to be processed to generate a result for query 510, the processing might proceed as follows. First accessing operation 526 is used to retrieve the data for the users table from the file containing that data In some examples, accessing operation 526 may include the forming of an abbreviated query similar to "SELECT users". Similarly, accessing operation 527 is used to retrieve the data for the addresses table from the file containing that data. In some examples, accessing operation 527 may include the forming of an abbreviated query similar to "SELECT addresses". At joining operation 525, the federated query engine performs the "users AS u JOIN addresses AS a ON u.id=a.user_id" portion of query 510. This includes matching up entries from the users data retrieved during operation 526 with the addresses data retrieved during operation 527, where the matching is based on the id field of the users entries and the user_id field of the addresses entries. At selecting operation 524, the federated query engine performs the "WHERE a.state='France'" portion of query 510. This includes filtering the results from the joining operation 525 to retain those entries with an address in France. At sorting operation 523, the federated query engine performs the "ORDER by u.name" portion of query 510. This includes sorting the results from the selecting operation 524 based on the name field. At limiting operation 522, the federated query engine performs the "LIMIT 100" portion of query 510 to keep the first 100 entries in the results from the ordering operation 523. At projecting operation 521, the federated query engine performs the "SELECT u.name, a. city" portion of query 510 to retain just the name and city fields in the results from the limiting operation 522.

Query plan 530 is representative of a query plan that may be used by the federated query engine when the data source is a nosql database that does not support joining operations. Query plan 530 demonstrates a query building process where the federated query engine supplements the capabilities of the nosql database to provide the joining operation. Query plan 530 is organized as a tree and includes processing operations for a projecting 531, a limiting 532, a joining 533, and two accessing 534 and 535 operations. Query plan 530 is generally processed from bottom to top beginning with the accessing operations 534 and 535 and ending with the projection operation 531.

For example, if query plan 530 were to be processed to generate a result for query 510, the processing might proceed as follows. First accessing operation 534 is used to retrieve the data for the users table from the nosql table containing that data and perform the specified ordering operation on that data. In some examples, accessing operation 534 may include the forming of an abbreviated query similar to "SELECT users AS u ORDER BY u.name". Similarly, accessing operation 535 is used to retrieve the data for the addresses table from the nosql table containing that data and perform the specified limiting operation on that data. In some examples, accessing operation 535 may include the forming of an abbreviated query similar to "SELECT addresses AS a WHERE a.state='France'". At joining operation 533, the federated query engine performs the "users AS u JOIN addresses AS a ON u.id=a.user_id" portion of query 510. This includes matching up entries from the users data retrieved during operation 534 with the addresses data retrieved during operation 535, where the matching is based on the id field of the users entries and the user_id field of the addresses entries. Joining operation 533 also preserves the ordering from accessing operation 534. At limiting operation 532, the federated query engine performs the "LIMIT 100" portion of query 510 to keep the first 100 entries in the results from the joining operation 533. At projecting operation 531, the federated query engine performs the "SELECT u.name, a. city" portion of query 510 to retain just the name and city fields in the results from the limiting operation 532.

Query plan 540 is representative of a query plan that may be used by the federated query engine when the data source is a relational database that provides more complete SQL support. Query plan 540 demonstrates a query building process where the federated query engine relies on the relational database to perform the entire query. Query plan 540 includes an access operation 541. In some examples, the federated query engine may perform some translation of query 510, when the query language of the relational database differs in syntax from the query language of query 510, before initiating accessing operation 541.

Referring back to FIG. 3, at a process 335, each of the query plans formed during process 330 are evaluated. The evaluation includes traversing the respective query plan tree to determine an estimated cost for performing the query received during process 305 using a data source of the type associated with the respective query plan. In performing the query plan evaluation, each of the nodes in the query plan trees is assigned a cost and the costs are totaled. For query plan operations that are performed in the federated query engine (e.g., projecting, limiting, sorting, selecting, grouping, joining, and/or similar operations), the same cost is generally used for each operation type irrespective of the type of the data source associated with the query plans. For query plan operations that are performed in the data sources (e.g., the accessing operations), the cost generally depends on the particular data source.

In some examples, the costs for each operation type may be assigned by an administrator, an operator, and/or a user of the hybrid multi data source. In some examples, the costs for each operation type may be assigned based on metrics and/or statistics gathered during processing of previous operations of the same type. In some examples, the metrics and/or statistics may include a weighted average related to the time required to perform a designated number of previous operations of the corresponding type. In some examples, the weighted average may provide more emphasis on more recent uses of the respective operations, perhaps by using exponential smoothing. In some examples, the costs for the various operations may generally be selected based on a relative scale so that the costs for the operations performed by the federated query engine may be ordered from limiting, with the lowest cost, to projecting, unioning, sorting, and finally joining with the highest cost. Similarly, the costs of accessing each of the data source types may be ordered from flat files, with the lowest cost, to XML files, REST web services, SOAP web services, nosql databases, and finally relational databases with the highest cost. In some examples, the order of the accessing operation costs may also be adjusted based on locations of the respective data sources and/or other factors. In some examples, process 335 may be performed using federated query engine 250. In some examples, when the filtered list of available data sources includes a single data source, process 335 may be skipped.

Figure 6:
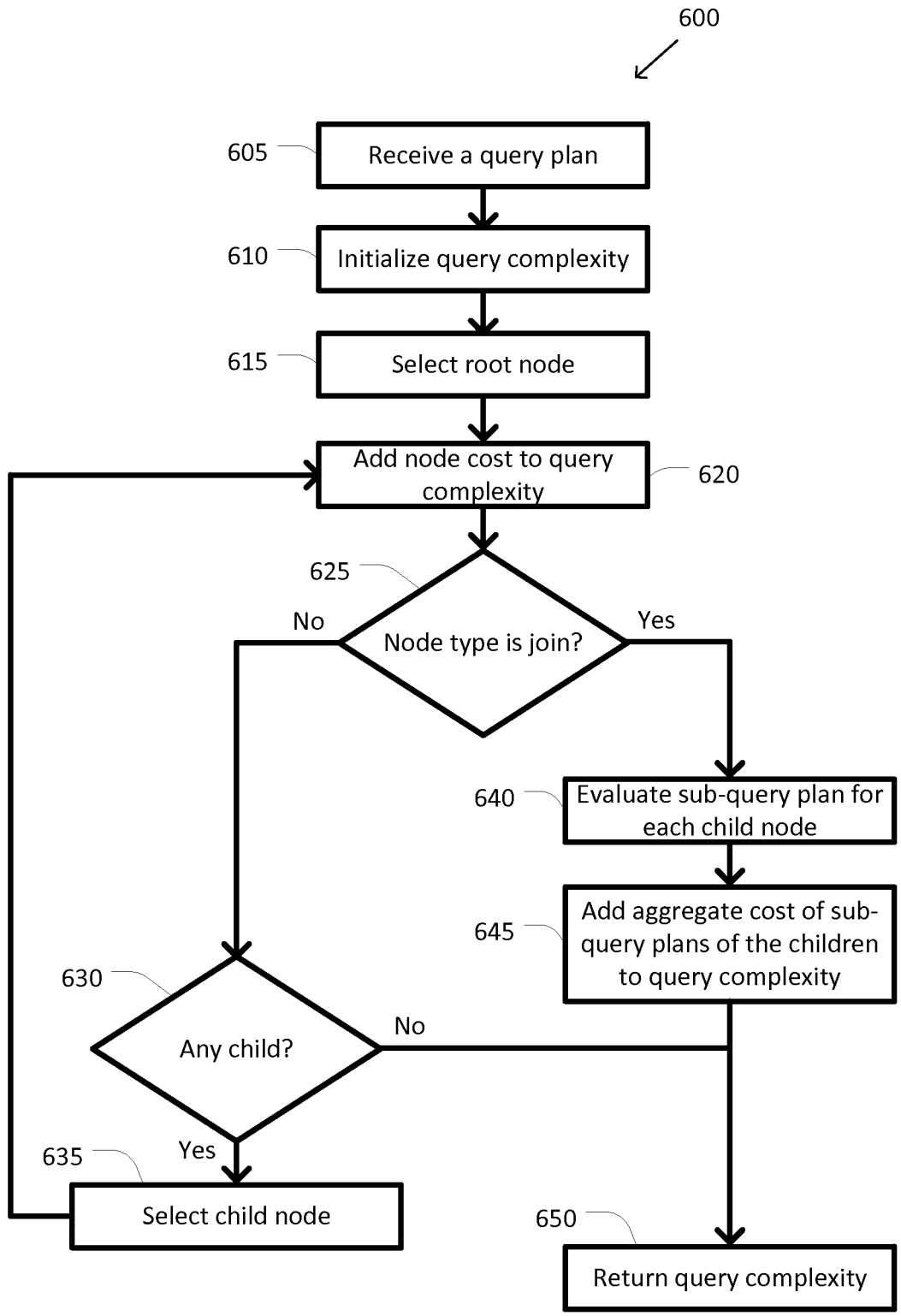
FIG. 6 is a simplified diagram of a method of query plan evaluation according to some examples.

FIG. 6 is a simplified diagram of a method 600 of query plan evaluation according to some examples. In some examples, one or more of the processes 605-650 of method 600 may be implemented, at least in part, in the form of executable code stored on non-transient, tangible, machine readable media that when run by one or more processors (e.g., the processor 140 of server 130) may cause the one or more processors to perform one or more of the processes 605-650. In some examples, method 600 may be used by a query plan evaluator in a federated query engine 250 to evaluate a query plan during process 335.

At a process 605, a query plan is received. As the federated query engine evaluates one or more query plans, it passes each of the query plans in turn to the query plan evaluator. In some examples, federated query engine may use an API call to begin evaluation of a designated query plan.

At a process 610, query complexity is initialized. In some examples, the query complexity or query plan cost may be initialized to zero. In some examples, the query complexity may be initialized to a default value that estimates general overhead for performing a query plan. In some examples, the default value may be set by an administrator, an operator, a user, or by metrics and/or statistics gathered from prior query plan processing.

At a process 615, the root node of the query plan is selected. Evaluation of the query plan begins at the top or root node of the query plan. In the examples of FIG. 5, the root node of query plan 520 is projecting operation 521, the root node of query plan 530 is projecting operation 531, and the root node of query plan 540 is accessing operation 541. The selected node becomes the current node.

At a process 620, the cost of the current node is added to the query complexity. Based on the type of operation of the current node, the corresponding node cost of that type of operation is added to the query complexity. In some examples, the query plan evaluator may reference a table or other data structure associating costs with each of the various types of operations.

At a process 625, it is determined whether the current node is a join operation node. When the current node is a join operation node, this indicates that the query plan is going to split below the current node and at least two sub-query plans are to be evaluated. In the examples, of FIG. 5, query plan 520 includes two sub-queries below the join operation 525 and query plan includes two sub-queries below the join operation 533. When the current node is not a join operation node, the query plan is further processed beginning with a process 630. When the current node is a join operation node, the two sub-queries are separately evaluated beginning with a process 640.

At the process 630, it is determined whether the current node has a child node. The current node of the query plan is examined to determine whether the current node is at the bottom of the query plan tree or whether additional nodes are to be evaluated. In the examples of FIG. 5, operations 521-524, 531, and 532 have a child and operations 526, 527, 534, 535, and 541 do not have a child. When the current node has a child, the child node is selected as the current node using a process 635. When the current node does not have a child, the query complexity is returned using a process 650.

At the process 635, the child node is selected. Evaluation of the query plan continues by iterating down through the query plan tree processing each node in turn. Once the child node is selected it becomes the current node and is evaluated beginning with process 620.

At the process 640, the sub-query plan for each child node is evaluated. When the current node is a join operation node, the current node has at least two children. Each of the children is a root node of a sub-query plan. The sub-query plan for each of the children is evaluated recursively using method 600 by providing sub-query plan to process 605. In the examples of FIG. 5, join operation 525 has two children, accessing operations 526 and 527. Each of the accessing operations 526 and 527 is the root node of a sub-query plan that is separately evaluated. Each of the separate sub-query evaluations returns a query complexity that represents the cost of the respective sub-query plan.

At a process 645, an aggregate cost of the sub-query plans of the children is added to the query complexity. The cost of the sub-query plans of the children of the current node are aggregated together and added to the query complexity. In some examples, the aggregation may select the highest cost sub-query plan from among the children. In some examples, the aggregation may be weighted sum of the costs of each of the sub-query plans. In some examples, the weighted sum may be a total and/or an average. After the sub-query plans are aggregated and added to the query complexity, the query complexity is returned using process 650.

At the process 650, the query complexity is returned. For example, when the query plan evaluation is started by making an API call to a query evaluation function, the query complexity may be returned as the return value for the query evaluation function.

Referring back to FIG. 3, at a process 340, a data source is selected. Using the evaluations of the query plans determined during process 335, a data source to use to handle the query is selected. In some examples, the federated query engine may select the data source with the lowest evaluated cost to minimize the cost of processing the query. In some examples, the federated query engine may support load balancing by selecting the data source using a probabilistic approach. To so this, a probability for each data source is determined using the evaluated costs as shown in Equation 1, where n is the number of data sources, $c_i$ is the evaluated cost for the ith data source, and $p_i$ is the probability that the ith data source is selected. The data source is then selected based on the probabilities.

$$p_i = \left(\frac{1}{n-1}\right)\left(1 - \frac{c_i}{\sum_{i=1}^{n} c_i}\right) \quad (1)$$

In some examples, the federated query engine may provide failover support by iteratively selecting data sources, based on one of the other criteria, until a data source with a query plan that is able to complete the query received during process 305 is found. In some examples, when the filtered list of available data sources includes a single data source, process 240 may, by default, select the single data source. In some examples, process 340 may be performed using federated query engine 250.

At a process 345, the query plan for the selected data source is processed. The query plan associated with the data source selected during process 340 is processed by the federated query engine. In some examples, processing of the query plan may be consistent with the query plan processing described above with respect to the sample query plans 520, 530, and/or 540 of FIG. 5. In some examples, process 345 may be performed using federated query engine 250.

At a process 350, a query result is returned. The result of the query plan processed during process 345 is returned to the service and/or the application that provided the query received during process 305. In some examples, when the query is provided to the hybrid multi data source using a call to an API function, the results may be returned as the return value for the API function.

As discussed above and further emphasized here, FIG. 3 is merely an example which should not unduly limit the scope of the claims. One of ordinary skill in the art would recognize many variations, alternatives, and modifications. In some examples, the federated query engine may also be responsible for data consistency across each of the data sources accessible by the hybrid multi data source. In some examples, when the federated query engine receives a query during process 305 that alters data (e.g., a DELETE, INSERT, ALTER and/or UPDATE query), a query plan may be formed for each available data source and then processed. This may occur irrespective of whether the query might include hints or whether data source rules are available. In some examples, both the hints and the data source rules may be used to filter the list of available data sources.

Some examples of server 130, application servers 160 and/or 200, and/or hybrid multi data source 220 may include non-transient, tangible, machine readable media that include executable code that when run by one or more processors (e.g., processor 140) may cause the one or more processors to perform the processes of methods 300 and/or 600 as described above. Some common forms of machine readable media that may include the processes of methods 300 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of processing a data source query, the method comprising:
receiving the data source query at a hybrid multi data source running on a computer server;
creating a list of data sources, each data source in the list of data sources having a data source type selected from a group consisting of a relational data base, a nosql database, a flat file, an XML file, a representational state transfer (REST) web service, and a Simple Object Access Protocol (SOAP) web service;
removing data sources from the list of data sources based on the data source type of each of the data sources in the list of data sources and data source type hints included in the data source query;
removing data sources from the list of data sources based on the data source type of each of the data sources in the list of data sources and data source rules identifying preferred data source types based on features of the data source query;
forming one or more query plans for processing the data source query, each query plan corresponding to a data source in the list of data sources after the removings;
evaluating each of the query plans;
selecting a first query plan from the query plans based on results of the evaluating; and
performing the first query plan.

2. The method of claim 1, further comprising extracting the data source hints from a source type clause in the data source query.

3. The method of claim 1, further comprising omitting the removing of data sources from the list of data sources based on the data source rules when there is no overlap between the preferred data source types and data source types of the data sources in the list of data sources.

4. The method of claim 1 wherein removing data sources from the list of data sources based on the data source rules comprises removing each of the data sources from the list of data sources that do not have a data source type in the preferred data source types.

5. The method of claim 1, further comprising omitting the removing of data sources from the list of data sources based on the data source rules when there is an overlap between first data source types included in the data source type hints and second data source types of the data sources in the list of data sources.

6. The method of claim 1, further comprising omitting the removing of data sources from the list of data sources based on the data source type hints when there is no overlap between first data source types included in the data source type hints and second data source types of the data sources in the list of data sources.

7. The method of claim 1 wherein removing data sources from the list of data sources based on the data source type hints comprises removing any data sources from the list of data sources that do not have a first data source type associated with second data source types included in the data source type hints.

8. The method of claim 1 wherein:
each of the query plans is associated with a respective query plan tree comprising one or more nodes; and
evaluating each of the query plans comprises adding a node cost associated with a type of each of the nodes in the respective query plan tree to a query plan cost for that query plan.

9. The method of claim 8 wherein when one of the nodes is a join node, the node cost for the join node is based on an aggregation of a cost of each sub-query plan associated with children of the join node.

10. The method of claim 1 wherein selecting the first query plan based on the results of the evaluating comprises selecting the first query plan from the query plans that has a lowest cost.

11. The method of claim 1 wherein selecting the first query plan based on the results of the evaluating comprises selecting the first query plan based on probabilities associated with costs of each of the query plans.

12. The method of claim 1, further comprising selecting a second query plan from the query plans when the first query plan cannot be performed.

13. An application server comprising:
   memory; and
   one or more processors coupled to the memory;
   wherein the application server hosts a hybrid multi data source comprising:
      a hint resolver;
      a rule evaluator coupled to the hint resolver; and
      a federated query engine coupled to the hint resolver and the rule evaluator;
   wherein:
      the hybrid multi data source is configured to:
         receive a query; and
         create a list of data sources coupled to the hybrid multi data source, each data source in the list of data sources having a data source type selected from a group consisting of a relational data base, a nosql database, a flat file, an XML file, a representational state transfer (REST) web service, and a Simple Object Access Protocol (SOAP) web service;
      the hint resolver is configured to:
         receive the list of data sources from the hybrid multi data source; and
         remove data sources from the list of data sources based on the data source type of each of the data sources in the list of data sources and data source type hints included in the query;
      the rule evaluator is configured to:
         receive the list of data sources after the removings from the hybrid multi data source or the hint resolver;
         receive the query from the hybrid multi data source; and
         remove data sources from the list of data sources based on the data source type of each of the data sources in the list of data sources after the removings and data source rules identifying preferred data source types based on features of the data source query;
      the federated query engine is configured to:
         receive the filtered list of data sources from the hint resolver or the rule evaluator;
         receive the query from the hybrid multi data source;
         form one or more query plans for processing the query, each query plan corresponding to a data source in the filtered list of data sources;
         evaluate each of the query plans to determine a respective estimated cost to perform each of the query plans;
         select a query plan from the query plans based on each respective estimated cost; and
         perform the selected query plan.

14. The hybrid multi data source of claim 13 wherein the selected query plan has a lowest estimated cost from among each of the query plans.

15. The hybrid multi data source of claim 13 wherein the selected query plan is selected based on probabilities associated with estimated costs of the query plans.

16. A non-transitory machine-readable medium comprising a first plurality of machine-readable instructions which when executed by one or more processors associated with an application server are adapted to cause the one or more processors to perform a method comprising:
   receiving a data query at a hybrid multi data source running on the application server;
   creating a list of data sources coupled to the hybrid multi data source, each data source in the list of data sources having a data source type selected from a group consisting of a relational data base, a nosql database, a flat file, an XML file, a representational state transfer (REST) web service, and a Simple Object Access Protocol (SOAP) web service;
   removing data sources from the list of data sources based on the data source type of each of the data sources in the list of data sources and data source type hints included in the data query;
   removing data sources from the list of data sources based on the data source type of each of the data sources in the list of data sources and data source rules identifying preferred data source types based on features of the data query;
   forming one or more query plans for processing the data query, each query plan corresponding to a data source in the list of data sources after the removings;
   evaluating each of the query plans to determine a respective estimated query complexity for each of the query plans;
   selecting a query plan from the query plans based on each respective estimated query complexity; and
   performing the selected query plan.

17. The non-transitory machine-readable medium of claim 16, further comprising a second plurality of machine-readable instructions which when executed by the one or more processors are adapted to cause the one or more processors to perform a method comprising:
   selecting the query plan from the query plans that has a lowest estimated query complexity.

18. The non-transitory machine-readable medium of claim 16, further comprising a second plurality of machine-readable instructions which when executed by the one or more processors are adapted to cause the one or more processors to perform a method comprising:
   selecting the query plan from the query plans based on probabilities associated with estimated query complexities of the query plans.

* * * * *